(12) United States Patent
Thang et al.

(10) Patent No.: US 10,313,414 B2
(45) Date of Patent: Jun. 4, 2019

(54) APPARATUS AND METHOD FOR PROVIDING STREAMING CONTENT USING REPRESENTATIONS

(71) Applicant: Electronics and Telecommunications Research Institute, Daejeon (KR)

(72) Inventors: Truong Cong Thang, Daejeon (KR); Jin Young Lee, Daejeon (KR)

(73) Assignee: Ideahub, Seoul (KR)

(*) Notice: Subject to any disclaimer, the term of this patent is extended or adjusted under 35 U.S.C. 154(b) by 0 days.

(21) Appl. No.: 16/229,092

(22) Filed: Dec. 21, 2018

(65) Prior Publication Data
US 2019/0132374 A1    May 2, 2019

Related U.S. Application Data

(63) Continuation of application No. 16/168,933, filed on Oct. 24, 2018, which is a continuation of application
(Continued)

(30) Foreign Application Priority Data

Mar. 16, 2011  (KR) .................. 10-2011-0023271
Mar. 16, 2012  (KR) .................. 10-2012-0026862

(51) Int. Cl.
*G06F 15/16*  (2006.01)
*H04L 29/06*  (2006.01)
(Continued)

(52) U.S. Cl.
CPC ........ *H04L 65/601* (2013.01); *H04L 65/4084* (2013.01); *H04L 65/602* (2013.01);
(Continued)

(58) Field of Classification Search
CPC . H04L 65/601; H04L 65/4084; H04L 65/602; H04N 21/23439; H04N 21/25825;
(Continued)

(56) References Cited

U.S. PATENT DOCUMENTS 8,782,268 B2 * 7/2014 Pyle .............. H04N 21/234327
709/219
8,806,615 B2   8/2014 Ahuja et al.
(Continued)

FOREIGN PATENT DOCUMENTS

CN    101589625 A    11/2009
EP    2 224 732 A1    9/2010
(Continued)

OTHER PUBLICATIONS

"HTTP Streaming: Media presentation data model", 3GPP TSG-SA4 #56, Sophia Antipolis, France, Nov. 9-13, 2009 (13 pages in English).
(Continued)

*Primary Examiner* — Melvin H Pollack
(74) *Attorney, Agent, or Firm* — NSIP Law

(57) ABSTRACT

A method and apparatus for an adaptive Hypertext Transfer Protocol (HTTP) streaming service using metadata of media content are provided. The media content may include a sequence of one or more periods. Each of the periods may include one or more representations. The metadata may include information used to describe a relationship between the representations, and include information for terminals having different display bit depth.

30 Claims, 5 Drawing Sheets

Related U.S. Application Data

No. 15/834,702, filed on Dec. 7, 2017, now Pat. No. 10,122,780, which is a continuation of application No. 14/004,644, filed as application No. PCT/KR2012/001922 on Mar. 16, 2012, now Pat. No. 9,860,293.

(51) Int. Cl.

| | | |
|---|---|---|
| *H04N 21/8543* | (2011.01) | |
| *H04N 21/61* | (2011.01) | |
| *H04N 21/845* | (2011.01) | |
| *H04N 21/258* | (2011.01) | |
| *H04N 21/2343* | (2011.01) | |
| *H04N 21/84* | (2011.01) | |

(52) U.S. Cl.
CPC . *H04N 21/23439* (2013.01); *H04N 21/25825* (2013.01); *H04N 21/6125* (2013.01); *H04N 21/84* (2013.01); *H04N 21/8456* (2013.01); *H04N 21/8543* (2013.01)

(58) Field of Classification Search
CPC .............. H04N 21/6125; H04N 21/84; H04N 21/8456; H04N 21/8543
USPC .......................................................... 709/219
See application file for complete search history.

(56) References Cited

U.S. PATENT DOCUMENTS

| | | | |
|---|---|---|---|
| 8,914,835 | B2 | 12/2014 | Chen et al. |
| 8,935,249 | B2 | 1/2015 | Traub et al. |
| 8,966,106 | B2 | 2/2015 | Wang et al. |
| 9,037,502 | B2 | 5/2015 | Mikkelsen et al. |
| 9,160,779 | B2 * | 10/2015 | Cherian ................. H04L 65/605 |
| 9,176,984 | B2 | 11/2015 | Hull et al. |
| 9,277,252 | B2 * | 3/2016 | Ha .................... H04N 21/23439 |
| 9,319,448 | B2 | 4/2016 | Chen et al. |
| 9,369,687 | B2 * | 6/2016 | Braness .......... G11B 20/00086 |
| 9,467,493 | B2 * | 10/2016 | Thang ................. H04L 65/4084 |
| 9,473,476 | B2 | 10/2016 | Raju et al. |
| 9,497,290 | B2 * | 11/2016 | Furbeck .............. H04L 65/1083 |
| 9,531,579 | B2 * | 12/2016 | Willig .................. H04L 65/1016 |
| 9,531,779 | B2 | 12/2016 | Pantos et al. |
| 9,558,282 | B2 | 1/2017 | Biderman et al. |
| 9,607,655 | B2 | 3/2017 | Bloch et al. |
| 9,621,610 | B2 * | 4/2017 | Gabin ................. H04L 65/4084 |
| 9,646,352 | B2 | 5/2017 | McClements, IV |
| 9,652,559 | B2 | 5/2017 | Byrne et al. |
| 9,661,104 | B2 * | 5/2017 | Furbeck .............. H04L 65/4084 |
| 9,699,486 | B2 * | 7/2017 | Kwon ............ H04N 21/234327 |
| 9,716,736 | B2 | 7/2017 | Harrison |
| 9,729,830 | B2 * | 8/2017 | May, Jr. ............. H04N 7/17318 |
| 9,756,364 | B2 * | 9/2017 | Ha .................... H04N 21/23439 |
| 9,762,635 | B2 | 9/2017 | Sebastian et al. |
| 9,781,188 | B2 * | 10/2017 | Lee .................. H04N 21/23439 |
| 9,813,472 | B2 * | 11/2017 | Hurst ................. H04N 7/17336 |
| 9,838,450 | B2 | 12/2017 | McGowan |
| 9,860,573 | B2 * | 1/2018 | Kwon ............. H04N 21/23439 |
| 9,872,329 | B2 | 1/2018 | Kimmich et al. |
| 9,917,874 | B2 * | 3/2018 | Luby ................ H04N 21/23106 |
| 9,961,388 | B2 | 5/2018 | Harrison et al. |
| 9,967,598 | B2 * | 5/2018 | Ha ..................... H04N 21/2402 |
| 9,978,023 | B2 | 5/2018 | Levin et al. |
| 10,032,485 | B2 * | 7/2018 | Ahsan ..................... G11B 20/10 |
| 2005/0071755 | A1 | 3/2005 | Harrington et al. |
| 2006/0047779 | A1 | 3/2006 | Deshpande |
| 2006/0174315 | A1 | 8/2006 | Kim et al. |
| 2008/0002776 | A1 | 1/2008 | Borer et al. |
| 2009/0141895 | A1 | 6/2009 | Anderson et al. |
| 2010/0266042 | A1 | 10/2010 | Koo et al. |
| 2011/0050727 | A1 | 3/2011 | Mukawa |
| 2011/0081083 | A1 | 4/2011 | Lee et al. |
| 2011/0123115 | A1 | 5/2011 | Lee et al. |
| 2011/0179185 | A1 * | 7/2011 | Wang .................. H04L 65/4084 709/231 |
| 2011/0307545 | A1 | 12/2011 | Bouazizi |
| 2013/0182643 | A1 * | 7/2013 | Pazos .................. H04L 65/4076 370/328 |
| 2013/0185398 | A1 | 7/2013 | Thang et al. |
| 2016/0239749 | A1 | 8/2016 | Perediy et al. |
| 2016/0269461 | A9 | 9/2016 | Thang et al. |
| 2017/0142180 | A1 | 5/2017 | McGowan et al. |
| 2019/0075179 | A1 * | 3/2019 | Thang ................. H04L 67/2804 |

FOREIGN PATENT DOCUMENTS

| | | |
|---|---|---|
| JP | 2002-335519 A | 11/2002 |
| KR | 10-2004-0025994 A | 3/2004 |
| KR | 10-2006-0087793 A | 8/2006 |
| KR | 10-0687730 B1 | 2/2007 |
| WO | WO 2008/049446 A1 | 5/2008 |
| WO | WO 2010/082786 A2 | 7/2010 |

OTHER PUBLICATIONS

ETSI "Universal Mobile Telecommunications System (UMTS); LTE; Transparent end-to-end Packet-switched Streaming Service (PSS); Protocols and codecs," European Telecommunications Standards Institute, (3GPP TS 26.234 version 9.3.0 Release 9). Jun. 2010, France, pp. 1-186 (In English).

3rd Generation Partnership Project, "Progressive Download and Dynamic Adaptive Streaming over HTTP (3GP-DASH)", 3GPP TS 26.247 V1.0.0, Release 10, 4DVANCED LTE, 2010, pp. 1-35.

3GPP "3rd Generation Partnership Project; Technical Specification Group Services and System Aspects Transparent end-to-end Packet-switched Streaming Service (PSS); Progressive Download and Dynamic Adaptive Streaming over HTTP (3GP-DASH)," 3GPP Organizational Partners, (Release 10) Aug. 2010, France, pp. 1-34 (In English).

Christian Timmerer, et al., "HTTP Streaming of MPEG Media," Proceedings of Streaming Day, Sep. 2010 (4 pages, in English).

Huawei Technologies Co., Ltd. "Partial Representation Management". 3GPP DRAFT; 3rd Generation Partnership Project (3GPP). 3GPP TSG-SA4 Meeting #60 S4-100642. XP050638790. Aug. 16-20, 2010. (3 pages, in English).

"3rd Generation Partnership Project; Technical Specification Group Services and System Aspects Transparent end-to-end Packet-switched Streaming Service (PSS); Progressive Download and Dynamic Adaptive Streaming over HTTP (3GP-DASH)(Release 10)." 3rd Generation Partnership Project (3GPP). 3GPP TS 26.cde. V1.0.0 (Aug. 2010). XP050442029. Aug. 25, 2010. (34 pages, in English).

"Information Technology—Dynamic Adaptive Streaming over HTTP (DASH)—Part 1: Media presentation description and segment format" of ISO/IEC DIS 23009-1. Aug. 30, 2011 (134 pages, in English).

International Search Report dated Oct. 4, 2012 in counterpart International Application No. PCT/KR2012/001922 (5 pages, in Korean, with complete English translation).

Chinese Office Action dated Jan. 25, 2016, in counterpart Chinese Application No. 201280013527.7 (10 pages, in Chinese).

\* cited by examiner

APPARATUS AND METHOD FOR PROVIDING STREAMING CONTENT USING REPRESENTATIONS

CROSS-REFERENCE TO RELATED APPLICATIONS

This application is a Continuation of U.S. application Ser. No. 16/168,933, filed on Oct. 24, 2018, which is a Continuation of U.S. application Ser. No. 15/834,702, filed on Dec. 7, 2017, now U.S. Pat. No. 10,122,780 B2, issued on Nov. 6, 2018, which is a Continuation of U.S. application Ser. No. 14/004,644, filed on Sep. 11, 2013, now U.S. Pat. No. 9,860,293 B2, issued on Jan. 2, 2018, which is a National Stage of International Application No. PCT/KR2012/001922, filed Mar. 16, 2012 and published as WO 2012/125006 on Sep. 20, 2012, which claims the benefit under 35 USC 119(a) and 365(b) of Korean Patent Application No. 10-2012-0026862, filed on Mar. 16, 2012, and Korean Patent Application No. 10-2011-0023271, filed on Mar. 16, 2011, the respective entire disclosures of all of the above are incorporated herein by reference for all purposes.

TECHNICAL FIELD

The present invention relates to a technology for providing streaming content, and more particularly, to an apparatus and method for providing media content using a representation of the media content.

BACKGROUND ART

Streaming is one of schemes for transmitting and playing back multimedia content such as sounds, moving images, and the like. A client may play back content while receiving the content through the streaming.

An adaptive streaming service refers to providing a streaming service using a communication scheme with a request of a client and a response of a server in response to the request.

The client may request a media sequence suitable for an environment of the client (for example, a transmission channel of the client), using the adaptive streaming service. The server may provide a media sequence matched to the request of the client among media sequences with various qualities that are included in the server.

The adaptive streaming service may be provided based on various protocols. A Hypertext Transfer Protocol (HTTP) adaptive streaming service refers to an adaptive streaming service provided based on an HTTP. A client of the HTTP adaptive streaming service may receive content from a server using the HTTP, and may transmit a request associated with a streaming service to the server.

DISCLOSURE OF INVENTION

Technical Goals

An aspect of the present invention provides an apparatus and method that may play back media content using representations including accessibility information.

Another aspect of the present invention provides an apparatus and method that may play back media content using information used to describe a relationship between representations of the media content.

Still another aspect of the present invention provides an apparatus and method that may play back media content using information of different representations for terminals having different display bit depths.

Technical Solutions

According to an aspect of the present invention, there is provided a method for providing media content, the method including: receiving metadata of media content, the metadata including one or more periods; accessing segments of the media content based on information provided by the metadata; and decoding and rendering data of the media content that is included in the segments, wherein each of the periods includes one or more representations of the media content, and wherein each of the representations includes information used to support disabled users who have difficulties in perceiving the media content.

A media component of each of the representations may be enhanced to cope with a problem of a disabled user, and enhancement of the media component may include at least one of adjustment of a contrast and adjustment of a colour.

The information included in each of the representations may indicate an intended use of each of the representations, and the intended use may include at least one of a sign language, a subtitle, a caption, and a description.

The information included in each of the representations may indicate an attribute providing a reference to an external Moving Picture Experts Group (MPEG)-21 Digital Item Adaptation (DIA).

According to another aspect of the present invention, there is provided a method for providing media content, including: receiving metadata of media content, the metadata including one or more periods; accessing segments of the media content based on information provided by the metadata; and decoding and rendering data of the media content that is included in the segments, wherein each of the periods includes one or more representations of the media content, and wherein the metadata includes an attribute describing a relationship between the representations.

A first representation among the representations may include an attribute indicating a list of a part of the representations, and may be used together with a representation among the part of the representations.

The first representation may be a representation used for audio description.

Each of the part of the representations may be a representation used for a video component.

A first representation among the representations may include an attribute indicating a list of a part of the representations.

A representation among the part of the representations may be replaced by the first representation.

According to still another aspect of the present invention, there is provided a method for providing media content, including: receiving metadata of media content, the metadata including one or more periods; accessing segments of the media content based on information provided by the metadata; and decoding and rendering data of the media content that is included in the segments, wherein each of the periods includes one or more representations of the media content, and wherein each of the representations includes a bit depth attribute used to select different representations for terminals having different display bit depths.

The bit depth attribute may indicate a number of bits used to represent a luma/chroma sample of visual content.

According to yet another aspect of the present invention, there is provided a terminal including: an access engine to receive metadata of media content, to receive segments of the media content based on information provided by the metadata, and to decode data of the media content that is included in the segments, the metadata including one or more periods; and a media engine to receive the data of the media content from the access engine, and to output the media content, wherein each of the periods includes one or more representations of the media content, and wherein each of the representations includes information used to support disabled users who have difficulties in perceiving the media content.

According to a further aspect of the present invention, there is provided a terminal including: an access engine to receive metadata of media content, to receive segments of the media content based on information provided by the metadata, and to decode data of the media content that is included in the segments, the metadata including one or more periods; and a media engine to receive the data of the media content from the access engine, and to output the media content, wherein each of the periods includes one or more representations of the media content, and wherein the metadata includes an attribute describing a relationship between the representations.

According to a further aspect of the present invention, there is provided a terminal including: an access engine to receive metadata of media content, to receive segments of the media content based on information provided by the metadata, and to decode data of the media content that is included in the segments, the metadata including one or more periods; and a media engine to receive the data of the media content from the access engine, and to output the media content, wherein each of the periods includes one or more representations of the media content, and wherein each of the representations includes a bit depth attribute used to select different representations for terminals having different display bit depths.

Effect of the Invention

According to embodiments of the present invention, it is possible to play back media content using representations including accessibility information.

Additionally, according to embodiments of the present invention, it is possible to play back media content using information used to describe a relationship between representations of the media content.

Furthermore, according to embodiments of the present invention, it is possible to play back media content using information of different representations for terminals having different display bit depths.

BEST MODE FOR CARRYING OUT THE INVENTION

Figure 1:
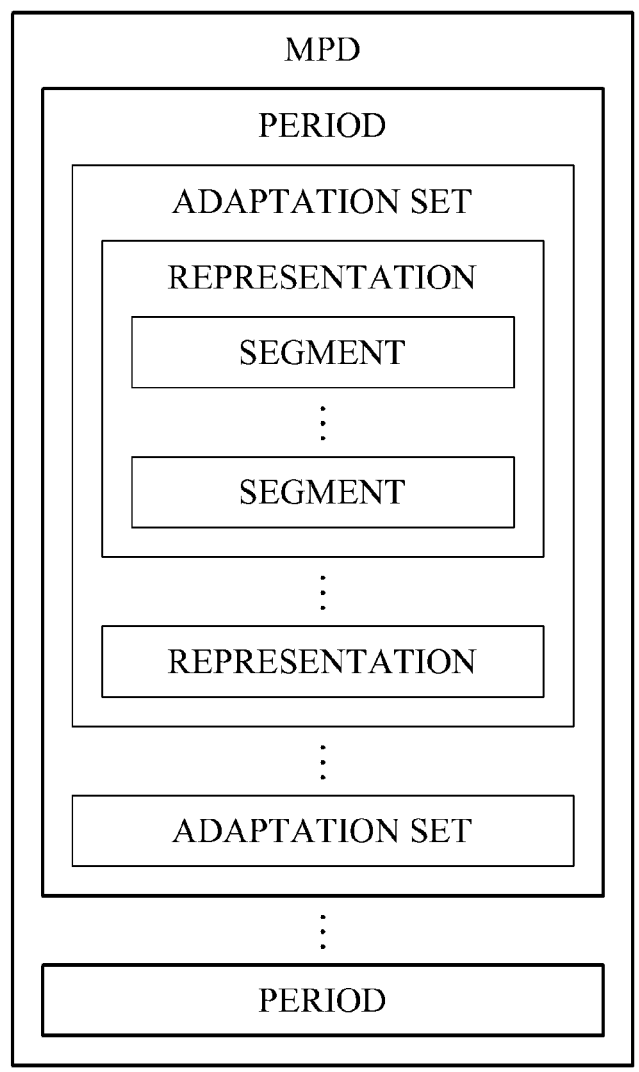
FIG. 1 is a diagram illustrating a Dynamic Adaptive Streaming over HTTP (DASH) high-level data model.

Reference will now be made in detail to embodiments of the present invention, examples of which are illustrated in the accompanying drawings, wherein like reference numerals refer to the like elements throughout. The embodiments are described below in order to explain the present invention by referring to the figures.

The entire document "Dynamic Adaptive Streaming over HTTP (DASH)—Part 1: Media presentation description and segment format" of ISO/IEC DIS 23009-1 published on Aug. 30, 2011, will be cited as references in the present application, and will used to describe the following embodiments.

Hereinafter, embodiments of the present invention will be further described with reference to the accompanying drawings, however, there is no limitation to the embodiments of the present invention. Like reference numerals refer to the like elements throughout.

The terms "specify," "indicate," and "mean" used herein may have the same meaning. Additionally, the terms "Uniform Resource Locator (URL)" and "Uniform Resource Identifier (URI)" used herein may have the same meaning, and may be interchangeable.

When indexes for a specific element are from 1 to N, or from 0 to N, the number of specific elements may be one or more. N may be an integer equal to or greater than 0.

Hereinafter, examples of terms used in embodiments will be described.

DASH may specify formats that enable 1) delivery of media content from an HTTP server to an HTTP client, and enable 2) caching of content by standard HTTP cashes. The formats may include, for example, an Extensible Markup Language (XML) format, or a binary format.

Media content may be a single media content period, or a contiguous sequence of media content periods. Hereinafter, media content, media, and content may be used as interchangeable terms. Media content may be a set of media content components having a common timeline, for example audios, videos, or timed texts. Additionally, media components may have relationships on how the media components may be presented (for example, individually, jointly, or mutually exclusive) as programs or movies. Media content may be content on demand, or live content.

Content may be divided into one or more intervals. In other words, the content may include one or more intervals. Hereinafter, an interval and a period may be used as interchangeable terms. The term period may be used as a term in $3^{rd}$ Generation Partnership Project (3GPP) adaptive HTTP streaming. In other words, a period may be an interval of a media presentation. A continuous sequence of all periods may constitute the media presentation.

One or more intervals may be a basic unit. One or more intervals may be described by signaling metadata. In other words, metadata may describe each of the one or more intervals. The metadata may be a Media Presentation Description (MPD) that will be described later.

A media content component may be a continuous component of media content with an assigned media component type. A media content component may be encoded individually into a media stream. A media component may be an encoded version of individual media types, such as audios, videos, or timed texts with specific attributes, for example bandwidths, languages, or resolutions.

A media stream may be an encoded version of a media content component

A media component type may be a single type of media content, such as audio, video, or text.

A media presentation may be a collection of data used to establish a bounded or unbounded presentation of media content. The media presentation may be a collection of data that is accessible to a DASH client to provide a streaming service to a user. An MPD may be described by an MPD. The media presentation may be a collection of data that is accessible to a DASH client to provide a streaming service to a user.

An MPD may be a formalized description for a media presentation to provide a streaming service. The MPD may be a document containing metadata required by a DASH client, to provide a user with a streaming service, and to construct appropriate HTTP-URLs to access segments. The media presentation may be described by an MPD including possible updates of the MPD.

An MPD may be a document containing metadata requested to a DASH client to construct appropriate HTTP-URLs in order to 1) access segments and to 2) provide a user with a streaming service. The HTTP-URLs may be absolute or relative. The MPD may be an XML-document.

The MPD may define a format to announce resource identifiers for segments. The MPD may provide a context for identified resources within the media presentation. The resource identifiers may be HTTP-URLs. URLs may be restricted by a byte range attribute.

A period may be an interval of a media presentation. A continuous sequence of all periods may constitute the media presentation. In other words, the media presentation may include one or more periods. Alternatively, the media presentation may include a sequence of one or more periods.

A representation may be a collection and encapsulation of one or more media streams in a delivery format, and may be associated with descriptive metadata. The representation may be a structured collection of one or more media components within a single period. In other words, the representation may be one of alternative choices of a complete set or subset of media content components forming media content during a defined period. The representation may include one or more media streams.

A representation may start at a beginning point of a period (namely, a period including the representation), and may continue to an ending point of the period.

A representation may be one of alternative choices of the media content or a subset of the media content typically differing by the encoding choice, for example by a bitrate, a resolution, a language, a codec, and the like.

An MPD (or an MPD element) may provide descriptive information that enables a client to select one or more representations.

Hereinafter, a representation and a media representation may be used as interchangeable terms.

Two or more sets of segments corresponding to a single interval may exist. Each of the sets may be called a representation, or an alternative.

A segment may be a smallest addressable unit in an MPD with a defined format. Hereinafter, a segment and a media segment may be used as interchangeable terms.

Each interval may be divided into segments. Hereinafter, a segment and a fragment may be used as interchangeable terms. The term segment may be used as a term of 3GPP adaptive HTTP streaming.

A segment may mean an entity body of a response to an HTTP/1.1 GET request for an HTTP-URL, for example as defined in RFC 2616, (or a GET request for a part indicated by a byte range).

A terminal may play back media content using received bytes (namely, a segment).

A sub-segment may mean a smallest unit within segments that may be indexed by a segment index at a segment level.

A sub-representation may be a part of a representation described in an MPD that is present in the entire period.

A Random Access Point (RAP) may be a specific location in a media segment. The RAP may be identified as a location in which playback may be started continuously from a location of the RAP using only information included in a media segment.

The DASH may provide a media-streaming model for delivery of media content. A client may exclusively control a session of the delivery. Clients may request data using the HTTP protocol from standard web servers that do not have DASH-specific capabilities. Accordingly, the DASH standard may focus on data formats used to provide a DASH media presentation.

A collection of encoded and deliverable versions of media content, and an appropriate description of the versions may form a media presentation. Media content may include one or more contiguous media content periods in time. Each media content period may include one or more media content components, for example audio components in various languages and a video component. A media content component type may be assigned to each media content component, and may include, for example, audio or video.

Each media content component may have one or more encoded versions. An encoded version of a media content component may be referred to as a "media stream." Each media stream may inherit attributes of media content used to encode media content, a media content period, or a media stream. Additionally, to each media stream, properties of an encoding process, such as sub-sampling, codec parameters, encoding bitrate, and the like, may be assigned. Accordingly, metadata may be relevant for static and dynamic selection of media content components and media streams.

FIG. 1 is a diagram illustrating a DASH high-level data model.

A DASH may be based on a hierarchical data model, as shown in FIG. 1.

A DASH media presentation may be described by an MPD document. The MPD may describe a sequence of periods in time. The sequence of the periods may form a media presentation. A period may typically represent a media content period during which a consistent set of encoded versions of media content is available. In other words, during a single period, bitrates, languages, captions, subtitles, and the like, may not be changed.

A period may include one or more adaptation sets. An adaptation set may represent a set of interchangeable encoded versions of one or more media content components. For example, an adaptation set for a main video component, and a separate adaptation set for a main audio component may exist. For example, when there are other available materials, for example captions or audio descriptions, the other available materials may each have a separate adaptation set.

An adaptation set may include one or more representations. A representation may describe a deliverable encoded version of one or more media content components. A representation may include one or more media streams. A single representation within an adaptation set may be sufficient to render the media content components included in the single representation. Typically, a client may switch from one representation to another representation during a period, in order to adapt to network conditions or other factors. The client may also ignore representations that rely on codecs or other rendering technologies that are not supported by the client, or that are otherwise unsuitable.

Within a representation, the content may be divided in time into segments. In other words, the representation may include one or more segments. A segment may be a basic unit of data that is advertised in an MPD. A URL may be provided for each segment. The providing of the URL may indicate that a segment is the largest unit of data that may be retrieved with a single HTTP request. The MPD may include a byte range of the URL, with the URL. Accordingly, the segment may be included in a byte range of other larger resources.

Hereinafter, a relationship between components of the above-described data model will be described.

An MPD may include a sequence of one or more periods.

Each of the periods may include one or more adaptation sets. When an adaptation set includes one or more media content components, each of the media content components may be individually defined.

Each of the adaptation sets may include one or more representations.

Each of the representations may include one or more sub-representations.

Each of the representations may include one or more segments.

Segments may include media data, and/or metadata to access, decode, and present media content including the segments.

Adaptation sets, representations and sub-representations may share common attributes and elements.

Each of the segments may include one or more subsegments.

An MPD document indicating an MPD may include an element "MPD."

The following Table 1 shows an XML schema of MPD.

TABLE 1

```
<?xml version="1.0" encoding="UTF-8"?>
<xs:schema targetNamespace="urn:mpeg:DASH:schema:MPD:2011"
  attributeFormDefault="unqualified"
  elementFormDefault="qualified"
  xmlns:xs="http://www.w3.org/2001/XMLSchema"
  xmlns:xlink="http://www.w3.org/1999/xlink"
  xmlns="urn:mpeg:DASH:schema:MPD:2011">
  <xs:import namespace="http://www.w3.org/1999/xlink"
    schemaLocation="http://www.w3.org/1999/xlink.xsd"/>
  <xs:annotation>
    <xs:appinfo>Media Presentation Description</xs:appinfo>
    <xs:documentation xml:lang="en">
      This Schema defines the Media Presentation
Description for MPEG-DASH.
    </xs:documentation>
  </xs:annotation>
  <!-- MPD: main element -->
  <xs:element name="MPD" type="MPDtype"/>
  . . .
</xs:schema>
```

Table 1 shows an initial part of the XML schema of the MPD. The initial part may include namespace and other definitions.

A mechanism for referencing remote elements from a local MPD may be defined. A subset of World Wide Web Consortium (W3C) XLINK simple links may be defined, consisting of 1) restricted syntax and semantics, and 2) a processing model.

XLINK attributes used in a part of ISO/IEC 23009 are provided as follows:

"xlink:type" may define a type of W3C XLINK that is being used.

"xlink:href" may identify a remote element using a URI, as defined in IETF RFC 3986.

"xlink:show" may define a desired behaviour of a remote element once dereferenced from within an MPD, as defined in W3C XLINK.

"xlink:actuate" may define a desired timing of dereferencing a remote element from within an MPD, as defined in W3C XLINK.

The following Table 2 shows an XML schema of XLINK.

TABLE 2

```
<?xml version='1.0' encoding='UTF-8'?>
<xs:schema xmlns:xs="http://www.w3.org/2001/XMLSchema"
  targetNamespace="http://www.w3.org/1999/xlink"
  xmlns:xlink="http://www.w3.org/1999/xlink">
  <xs:attribute name="type" type="xs:token" fixed="simple"/>
  <xs:attribute name="href" type="xlink:hrefType"/>
  <xs:simpleType name="hrefType">
    <xs:restriction base="xs:anyURI"/>
  </xs:simpleType>
  <xs:attribute name="show" type="xs:token" fixed="embed"/>
  <xs:attribute name="actuate" type="xlink:actuateType"
default="onRequest"/>
  <xs:simpleType name="actuateType">
    <xs:restriction base="xs:token">
      <xs:enumeration value="onLoad"/>
      <xs:enumeration value="onRequest"/>
    </xs:restriction>
  </xs:simpleType>
</xs:schema>
```

In the schema, a namespace, a name, a type, and a default value of each element or each attribute may be described. Additionally, a hierarchical relationship between elements and attributes may be described.

Rules applied to process URI references within the attribute "xlink:href" are provided as follows:

URI references to remote elements that cannot be resolved may be treated as invalid references, and may invalidate the MPD.

URI references to remote elements that are inappropriate targets for a given reference may be treated as invalid references, and may invalidate the MPD.

URI references that directly or indirectly reference themselves may be treated as invalid circular references, and may invalidate the MPD.

A reference to a remote element may be an HTTP-URL.

When a URI reference is relative, a reference resolution may be applied.

Semantics of the element "MPD" are described as follows:

1) The element "MPD" may have the following attributes:

"id" may specify an identifier for a media presentation. "id" may be an identifier that is unique within a scope in which the media presentation is published.

"type" may specify whether the MPD may be updated.

"mediaPresentationDuration" may specify a duration of the entire media presentation. When "mediaPresentationDuration" is absent, the duration of the media presentation may be unknown.

"maxSegmentDuration" may specify a maximum duration of a segment in a representation in the media presentation.

2) The element "MPD" may have the following elements:

"ProgramInformation" may have an index of 0 to N, and may specify descriptive information about a program. Having an index of N may indicate that a number of instances of an element may be unbounded. Having an index of 0 may indicate that an element may be optional. Having an index of 1 may indicate that an element is mandatory. In other words, a range of index may represent occurrence or cardinality.

"BaseURL" may have an index of 0 to N, and may specify a base URL that may be used for reference resolution and alternative URL selection.

"Location" may have an index of 0 to N, and may specify a location at which the MPD is available.

"Period" may have an index of 1 to N, and may specify information of a period.

"Metrics" may have an index of 0 to N, and may specify DASH metrics.

The following Table 3 shows an XML syntax of the element "MPD".

TABLE 3

```
<!-- MPD Type -->
<xs:complexType name="MPDtype">
  <xs:sequence>
    <xs:element name="ProgramInformation" type="ProgramInformationType" minOccurs="0" maxOccurs="unbounded"/>
    <xs:element name="BaseURL" type="BaseURLType" minOccurs="0" maxOccurs="unbounded"/>
    <xs:element name="Location" type="xs:anyURI" minOccurs="0" maxOccurs="unbounded"/>
    <xs:element name="Period" type="PeriodType" maxOccurs="unbounded"/>
    <xs:element name="Metrics" type="MetricsType" minOccurs="0" maxOccurs="unbounded"/>
    <xs:any namespace="##other" processContents="lax" minOccurs="0" maxOccurs="unbounded"/>
  </xs:sequence>
  <xs:attribute name="id" type="xs:string"/>
  <xs:attribute name="profiles" type="xs:string"/>
  <xs:attribute name="type" type="PresentationType" default="static"/>
  <xs:attribute name="availabilityStartTime" type="xs:dateTime"/>
  <xs:attribute name="availabilityEndTime" type="xs:dateTime"/>
  <xs:attribute name="mediaPresentationDuration" type="xs:duration"/>
  <xs:attribute name="minimumUpdatePeriod" type="xs:duration"/>
  <xs:attribute name="minBufferTime" type="xs:duration" use="required"/>
  <xs:attribute name="timeShiftBufferDepth" type="xs:duration"/>
  <xs:attribute name="suggestedPresentationDelay" type="xs:duration"/>
  <xs:attribute name="maxSegmentDuration" type="xs:duration"/>
  <xs:attribute name="maxSubsegmentDuration" type="xs:duration"/>
  <xs:anyAttribute namespace="##other" processContents="lax"/>
</xs:complexType>
<!-- Presentation Type enumeration -->
<xs:simpleType name="PresentationType">
  <xs:restriction base="xs:string">
    <xs:enumeration value="static"/>
    <xs:enumeration value="dynamic"/>
  </xs:restriction>
</xs:simpleType>
```

A media presentation may include one or more periods. Each of the periods may be defined by the element "Period" in the element "MPD."

Periods may be classified into regular periods and early available periods. Additionally, a PeriodStart time of a regular period may be defined as follows:

When attribute "start" is included in the element "Period", a period may be a regular period, and the PeriodStart time may be equal to a value of the attribute "start".

When the attribute "start" is absent, but a previous element "Period" includes attribute "duration", a period may be a regular period. The start time of the period "PeriodStart" may be a sum of a start time of a previous period and a value of the attribute "duration" of the previous period.

1) When the attribute "start" is absent, 2) when the element "Period" is the first in the MPD, and 3) when the attribute "type" of the MPD is "static," the PeriodStart time may be set to "0."

1) When the attribute "start" is absent, 2) when a previous element "Period" does not include attribute "duration", or when the element "Period" is the first in the MPD, and 3) when the attribute "type" of the MPD is "dynamic," a period may be an early available period.

Semantics of the element "Period" are described as follows:

1) The element "Period" may have the following attributes:

"xlink:href" may specify a reference to an external element "Period."

"xlink:actuate" may specify processing instructions. "link:actuate" may have a value of either "onload" or "onRequest.

"id" may specify an identifier of a period. "id" may be a unique identifier within a scope of a media presentation.

"start" may specify a PeriodStart time of a period. The PeriodStart time may be used as an anchor to determine an MPD start time of each media segment, as well as to determine a presentation time of each access unit in a media presentation timeline.

"duration" may specify a duration of a period to determine a PeriodStart time of a next period.

2) The element "Period" may have the following elements:

"BaseURL" may have an index of 0 to N, and may be used for reference resolution and alternative URL selection.

"AdaptationSet" may have an index of 1 to N, and may specify information of an adaptation set.

"Subset" may have an index of 0 to N, and may specify a subset.

The following Table 4 shows an XML syntax of the element "Period."

TABLE 4

```
<!-- Period -->
<xs:complexType name="PeriodType">
  <xs:sequence>
    <xs:element name="BaseURL" type="BaseURLType" minOccurs="0" maxOccurs="unbounded"/>
    <xs:element name="SegmentBase" type="SegmentBaseType" minOccurs="0"/>
    <xs:element name="SegmentList" type="SegmentListType" minOccurs="0"/>
    <xs:element name="SegmentTemplate" type="SegmentTemplateType" minOccurs="0"/>
    <xs:element name="AdaptationSet" type="AdaptationSetType" minOccurs="0" maxOccurs="unbounded"/>
    <xs:element name="Subset" type="SubsetType" minOccurs="0" maxOccurs="unbounded"/>
```

TABLE 4-continued

```
    <xs:any namespace="##other" processContents="lax" minOccurs="0" maxOccurs="unbounded"/>
    </xs:sequence>
    <xs:attribute ref="xlink:href"/>
    <xs:attribute ref="xlink:actuate" default="onRequest"/>
    <xs:attribute name="id" type="xs:string" />
    <xs:attribute name="start" type="xs:duration"/>
    <xs:attribute name="duration" type="xs:duration"/>
    <xs:attribute name="bitstreamSwitching" type="xs:boolean" default="false"/>
    <xs:anyAttribute namespace="##other" processContents="lax"/>
</xs:complexType>
```

Each period may include one or more adaptation sets. Each of the adaptation sets may be described by element "AdaptationSet" included in the element "Period."

An adaptation set may include alternate encodings of one or more media content components. Each of the alternate encodings may be included in a representation. All representations included in a single adaptation set may represent the same media content components, and may include one or more media streams that are determined to be perceptually equivalent.

One or more representations may be arranged in an adaptation set based on properties of media content components present in the representations. The properties of the media content components may include 1) a language described by attribute "lang", 2) a media component type described by attribute "contentType", 3) a picture aspect ratio described by attribute "par", 4) a role property described by element "Role", 5) an accessibility property described by element "Accessibility", 6) a viewpoint property as described by element "ViewPoint", 7) a rating property described by element "Rating," and the like.

The element "AdaptationSet" may include default values for elements and attributes associated with one or more representations included in an adaptation set. Hereinafter, a list of possible present elements and attributes that are common to the elements "AdaptationSet" and "Representation" will be described.

The element "AdaptationSet" may support description of ranges for attributes "bandwidth," "width," "height" and "framerate" that are associated with one or more representations included in an adaptation set. The description may provide a summary of all values for all of the representations included in the adaptation set. The representations included in the adaptation set may not have values outside the ranges defined in the adaptation set.

Adaptation sets may be classified into groups, using attribute "group".

Semantics of the element "AdaptationSet" are described as follows:

1) The element "AdaptationSet" may have the following attributes:

"xlink:href" may specify a reference to external element "AdaptationSet."

"xlink:actuate" may specify processing instructions. "link:actuate" may have a value of either "onload" or "onRequest.

"id" may specify an identifier of an adaptation set in the scope of the period. "id" may be a unique identifier within a scope including the containing Period. "id" may not exist in a remote element.

"group" may specify an identifier of a group that is unique in the scope of the period.

"lang" may declare language code(s) of an adaptation set. Syntax and semantics based on IETF RFC 5646 may be used.

"contentType" may specify a media content component type of an adaptation set. "type" may be a content-type of top-level. "type" may be defined in RFC1521.

"par" may specify a picture aspect ratio. "par" may include two integers. When "par" is present, attributes "width" and "height" for representations may also be present.

"minBandWidth" may specify a minimum value of the attribute "bandwidth" in all representations in an adaptation set.

"maxBandWidth" may specify a maximum value of the attribute "bandwidth" in all representations in an adaptation set.

"minWidth" may specify a minimum value of the attribute "width" in all representations in an adaptation set.

"maxWidth" may specify a maximum value of the attribute "width" in all representations in an adaptation set.

"minHeight" may specify a minimum value of the attribute "height" in all representations in an adaptation set.

"maxHeight" may specify a maximum value of the attribute "height" in all representations in an adaptation set.

"minFrameRate" may specify a minimum value of the attribute "frameRate" in all representations in an adaptation set.

"maxFrameRate" may specify a maximum value of the attribute "frameRate" in all representations in an adaptation set.

2) The element "AdaptationSet" may have the following elements:

"Accessibility" may have an index of 0 to N, and may specify information on an accessibility scheme.

"Role" may have an index of 0 to N, and may specify information on a role annotation scheme.

"Rating" may have an index of 0 to N, and may specify information on a rating scheme.

"Viewpoint" may have an index of 0 to N, and may specify information on a viewpoint annotation scheme.

"ContentComponent" may have an index of 0 to N, and may specify properties of a media content component included in an adaptation set.

"BaseURL" may have an index of 0 to N, and may be used for reference resolution and alternative URL selection.

"Representation" may have an index of 0 to N, and may specify a representation. At least one representation element may be included in each adaptation set. "Representation" may be a part of a remote element.

The following Table 5 shows an XML syntax of the element "AdaptationSet."

TABLE 5

```
<!-- Adaptation Set -->
<xs:complexType name="AdaptationSetType">
    <xs:complexContent>
        <xs:extension base="RepresentationBaseType">
            <xs:sequence>
                <xs:element name="Accessibility" type="DescriptorType" minOccurs="0" maxOccurs="unbounded"/>
                <xs:element name="Role" type="DescriptorType" minOccurs="0" maxOccurs="unbounded"/>
                <xs:element name="Rating" type="DescriptorType" minOccurs="0" maxOccurs="unbounded"/>
                <xs:element name="Viewpoint" type="DescriptorType" minOccurs="0" maxOccurs="unbounded"/>
                <xs:element name="ContentComponent" type=
```

TABLE 5-continued

```
"ContentComponentType" minOccurs="0" maxOccurs="unbounded"/>
       <xs:element name="BaseURL" type="BaseURLType"
minOccurs="0" maxOccurs="unbounded"/>
       <xs:element name="SegmentBase" type="SegmentBaseType"
minOccurs="0"/>
       <xs:element name="SegmentList" type="SegmentListType"
minOccurs="0"/>
       <xs:element name="SegmentTemplate" type=
"SegmentTemplateType" minOccurs="0"/>
       <xs:element name="Representation" type=
"RepresentationType" minOccurs="0" maxOccurs="unbounded"/>
     </xs:sequence>
     <xs:attribute ref="xlink:href"/>
     <xs:attribute ref="xlink:actuate" default="onRequest"/>
     <xs:attribute name="id" type="xs:unsignedInt"/>
     <xs:attribute name="group" type="xs:unsignedInt"/>
     <xs:attribute name="lang" type="xs:language"/>
     <xs:attribute name="contentType" type="xs:string"/>
     <xs:attribute name="par" type="xs:string"/>
     <xs:attribute name="minBandwidth" type="xs:unsignedInt"/>
     <xs:attribute name="maxBandwidth" type="xs:unsignedInt"/>
     <xs:attribute name="minWidth" type="xs:unsignedInt"/>
     <xs:attribute name="maxWidth" type="xs:unsignedInt"/>
     <xs:attribute name="minHeight" type="xs:unsignedInt"/>
     <xs:attribute name="maxHeight" type="xs:unsignedInt"/>
     <xs:attribute name="minFrameRate" type="xs:string"/>
     <xs:attribute name="maxFrameRate" type="xs:string"/>
     <xs:attribute name="segmentAlignment" type=
"ConditionalUintType" default="false"/>
     <xs:attribute name="subsegmentAlignment" type=
"ConditionalUintType" default="false"/>
     <xs:attribute name="subsegmentStartsWithSAP" type=
"SAPType" default="0"/>
     <xs:attribute name="bitstreamSwitching" type="xs:boolean"/>
    </xs:extension>
  </xs:complexContent>
</xs:complexType>
<!-- Conditional Unsigned Integer (unsignedInt or boolean) -->
<xs:simpleType name="ConditionalUintType">
  <xs:union memberTypes="xs:unsignedInt xs:boolean"/>
</xs:simpleType>
```

An adaptation set may include one or more media content components. Properties of each of the media content components may be described by the element "ContentComponet." When a single media content component is included in an adaptation set, properties of the media content component may be described directly by the element "AdaptationSet."

Semantics of the element "ContentComponent" are described as follows:

1) The element "ContentComponent" may have the following attributes:
   "id" may specify an identifier of a media component. "id" may be unique within a scope of an adaptation set.
   "lang" may declare language code(s) of a media content component. Syntax and semantics based on IETF RFC 5646 may be used.
   "contentType" may specify a type of a media content component. A value of the top-level content-type, namely "type", may be defined in RFC1521.
   "par" may specify a picture aspect ratio. "par" may include two integers. When "par" is present, attributes "width" and "height" for representations may also be present.

2) The element "ContentComponent" may have the following elements:
   "Accessibility" may have an index of 0 to N, and may specify information on an accessibility scheme.
   "Role" may have an index of 0 to N, and may specify information on a role annotation scheme.
   "Rating" may have an index of 0 to N, and may specify information on a ration scheme.
   "Viewpoint" may have an index of 0 to N, and may specify information on a viewpoint annotation scheme.

The following Table 6 shows an XML syntax of the element "ContentComponent."

TABLE 6

```
<!-- Content Component -->
<xs:complexType name="ContentComponentType">
  <xs:sequence>
    <xs:element name="Accessibility" type="DescriptorType"
minOccurs="0" maxOccurs="unbounded"/>
    <xs:element name="Role" type="DescriptorType" minOccurs="0"
maxOccurs="unbounded"/>
    <xs:element name="Rating" type="DescriptorType" minOccurs="0"
maxOccurs="unbounded"/>
    <xs:element name="Viewpoint" type="DescriptorType"
minOccurs="0" maxOccurs="unbounded"/>
    <xs:any namespace="##other" processContents="lax"
minOccurs="0" maxOccurs="unbounded"/>
  </xs:sequence>
  <xs:attribute name="id" type="xs:unsignedInt"/>
  <xs:attribute name="lang" type="xs:language"/>
  <xs:attribute name="contentType" type="xs:string"/>
  <xs:attribute name="par" type="xs:string"/>
  <xs:anyAttribute namespace="##other" processContents="lax"/>
</xs:complexType>
```

Representations may be described by the element "Representation." The element "AdaptationSet" may include one or more elements "Representation."

A representation may be one of alternative choices of a complete set or subset of media content components forming media content during a defined period.

A representation may start at the start of the PeriodStart of a period, and may continue to the end of the period. In other words, the end of the period may be the start of a next period, or the end of a media presentation.

Each representation may include one or more media streams. Each of the media streams may be an encoded version of a media content component.

A representation may include one or more segments.

Semantics of the element "Representation" are described as follows:

1) The element "Representation" may have the following attributes:
   "id" may specify an identifier of a representation. When a representation is functionally different from another representation within the same period, "id" may be unique within the scope of the period. "id" may not include whitespace characters.
   "bandwidth" may specify a bound on a data rate and data rate variation of a representation.
   "qualityRanking" may specify, a quality ranking of a representation, relative to other representations in the same adaptation set.
   "dependencyID" may specify all complementary representations that depend on in decoding and/or presentation process. "dependencyID" may be a whitespace-separated list of values of "id."

2) The element "Representation" may have the following elements:
   "BaseURL" may have an index of 0 to N, and may be used for reference resolution and alternative URL selection.
   "SubRepresentation" may have an index of 0 to N, and may specify information on a sub-representation that is embedded in a representation. "SubRepresentation" may be used for reference resolution and alternative URL selection.

The following Table 7 shows an XML syntax of the element "AdaptationSet."

TABLE 7

```
<!-- Representation -->
  <xs:complexType name="RepresentationType">
    <xs:complexContent>
      <xs:extension base="RepresentationBaseType">
        <xs:sequence>
          <xs:element name="BaseURL" type="BaseURLType" minOccurs="0" maxOccurs="unbounded"/>
          <xs:element name="SubRepresentation" type="SubRepresentationType" minOccurs="0" maxOccurs="unbounded"/>
          <xs:element name="SegmentBase" type="SegmentBaseType" minOccurs="0"/>
          <xs:element name="SegmentList" type="SegmentListType" minOccurs="0"/>
          <xs:element name="SegmentTemplate" type="SegmentTemplateType" minOccurs="0"/>
        </xs:sequence>
        <xs:attribute name="id" type="xs:string" use="required"/>
        <xs:attribute name="bandwidth" type="xs:unsignedInt" use="required"/>
        <xs:attribute name="qualityRanking" type="xs:unsignedInt"/>
        <xs:attribute name="dependencyId" type="StringVectorType"/>
        <xs:attribute name="mediaStreamStructureId" type="StringVectorType"/>
      </xs:extension>
    </xs:complexContent>
  </xs:complexType>
<!-- Whitespace-separated list of strings -->
<xs:simpleType name="StringVectorType">
  <xs:list itemType="xs:string"/>
</xs:simpleType>
```

A sub-representation may be embedded in a regular representation, and may be described by the element "Sub-Representation." The element "Representation" may include the element "SubRepresentation." The element "SubRepresentation" may describe properties of one or more media content components that are embedded in a representation. A representation and sub-representation may share common attributes and elements.

Semantics of the element "SubRepresentation" are described as follows:

The element "SubRepresentation" may have the following attributes:

"level" may specify a level of a sub-representation.

"dependency" may specify a set of sub-representations within a representation in which sub-representations depend on in decoding and/or presentation process, as a whitespace-separated list of values of "level."

"bandwidth" may be identical to the attribute "bandwidth" of the element "Representation," but may be applied to a sub-representation.

"contentComponet" may specify a set of all media content components that are included in a sub-representation, as a whitespace-separated list of values of "id" of the element "ContentComponent."

The following Table 8 shows an XML syntax of the element "SubRepresentation."

TABLE 8

```
<!-- SubRepresentation -->
<xs:complexType name="SubRepresentationType">
  <xs:complexContent>
    <xs:extension base="RepresentationBaseType">
      <xs:attribute name="level" type="xs:unsignedInt"/>
      <xs:attribute name="dependencyLevel" type="UIntVectorType"/>
      <xs:attribute name="bandwidth" type="xs:unsignedInt"/>
```

TABLE 8-continued

```
      <xs:attribute name="contentComponent" type="StringVectorType"/>
    </xs:extension>
  </xs:complexContent>
</xs:complexType>
<!-- Whitespace-separated list of unsigned integers -->
<xs:simpleType name="UIntVectorType">
  <xs:list itemType="xs:unsignedInt"/>
</xs:simpleType>
```

Hereinafter, common attributes and elements of the elements "AdaptationSet," "Representation," and "SubRepresentation" will be described.

1) The elements "AdaptationSet," "Representation," and "SubRepresentation" may have the following common attributes:

"profile" may specify a profile between associated representation(s) conforming to media presentation profiles. A value of "profile" may be a subset of a value in a predetermined higher level of a document hierarchy (representation, adaptation set, MPD). When "profile" is absent, the value of "profile" may be inferred to be the same as in a next higher level of the document hierarchy. For example, when "profile" is absent for a representation, "profile" at an adaptation set level may be valid for the representation.

"width" may specify a horizontal visual presentation size of a video media type on a grid determined by the attribute "sat" When "sar" is absent, a width and height may be specified as if a value of "sar" is "1:1."

"height" may specify a vertical visual presentation size of a video media type, on a grid determined by the attribute "sar."

"sar" may specify a sample aspect ratio of a video media component type. "sar" may be in the form of a string including two integers separated by ":". A first integer may specify a horizontal size of encoded video pixels in arbitrary units. A second integer may specify a vertical size of the encoded video pixels in arbitrary units.

"frameRate" may specify an output frame rate of a video media type in a representation. For example, when a frame or field rate is changed, a value of "frameRate" may be an average frame or half an average field rate over the entire duration of a representation.

"audioSampleRate" may be either a decimal integer value specifying a sampling rate of an audio media component type, or a whitespace separated pair of decimal integer values specifying a minimum sampling rate and a maximum sampling rate of the audio media component type. A value of "audioSampleRate" may be in samples per second.

"mimeType" may specify a MIME type of a concatenation of initialisation segment.

"codecs" may specify codecs that are present within a representation.

2) The elements "AdaptationSet," "Representation," and "SubRepresentation" may have the following common elements:

"FramePacking" may have an index of 0 to N, and may specify frame-packing arrangement information of a video media component type.

"AudioChannelConfiguration" may have an index of 0 to N, and may specify an audio channel configuration of an audio media component type.

"ContentProtection" element may have an index of 0 to N, and may specify information on content protection schemes used for associated representations.

The following Table 9 shows common XML syntax of the elements "AdaptationSet," "Representation," and "SubRepresentation."

TABLE 9

```
<!-- Representation base (common attributes and elements) -->
<xs:complexType name="RepresentationBaseType">
   <xs:sequence>
      <xs:element name="FramePacking" type="DescriptorType" minOccurs="0" maxOccurs="unbounded"/>
      <xs:element name="AudioChannelConfiguration" type="DescriptorType" minOccurs="0" maxOccurs="unbounded"/>
      <xs:element name="ContentProtection" type="DescriptorType" minOccurs="0" maxOccurs="unbounded"/>
      <xs:any namespace="##other" processContents="lax" minOccurs="0" maxOccurs="unbounded"/>
   </xs:sequence>
   <xs:attribute name="profiles" type="xs:string"/>
   <xs:attribute name="width" type="xs:unsignedInt"/>
   <xs:attribute name="height" type="xs:unsignedInt"/>
   <xs:attribute name="sar" type="xs:string"/>
   <xs:attribute name="frameRate" type="xs:string"/>
   <xs:attribute name="audioSamplingRate" type="xs:string"/>
   <xs:attribute name="mimeType" type="xs:string"/>
   <xs:attribute name="segmentProfiles" type="xs:string"/>
   <xs:attribute name="codecs" type="xs:string"/>
   <xs:attribute name="maximumSAPPeriod" type="xs:double"/>
   <xs:attribute name="startWithSAP" type="SAPType"/>
   <xs:attribute name="maxPlayoutRate" type="xs:double"/>
   <xs:attribute name="codingDependency" type="xs:boolean"/>
   <xs:attribute name="scanType" type="VideoScanType"/>
   <xs:anyAttribute namespace="##other" processContents="lax"/>
</xs:complexType>
<!-- Stream Access Point type enumeration -->
<xs:simpleType name="SAPType">
   <xs:restriction base="xs:unsignedInt">
      <xs:minInclusive value="0"/>
      <xs:maxInclusive value="6"/>
   </xs:restriction>
</xs:simpleType>
<!-- Video Scan type enumeration -->
<xs:simpleType name="VideoScanType">
   <xs:restriction base="xs:string">
      <xs:enumeration value="progressive"/>
      <xs:enumeration value="interlaced"/>
      <xs:enumeration value="unknown"/>
   </xs:restriction>
</xs:simpleType>
```

A segment may have a defined format, and may be the smallest addressable unit described by an MPD.

A segment may be referenced by an HTTP-URL included in the MPD. The HTTP-URL may be defined as an <absolute-URI> according to RFC 3986. The HTTP-URL may have a fixed scheme of "http://" or "https://," and may be restricted by a byte range when attribute "range" is provided together with the URL. The byte range may be expressed as "byte-range-spec" as defined in RFC 2616. The byte range may be restricted to a single expression identifying a contiguous range of bytes.

Segment information may be assigned to representations, through presence of elements "BaseURL," "SegmentBase," "SegmentTemplate" and/or "SegmentList." The segment information may provide information on location, availability and properties of all of one or more segments included in a representation. In particular, information on the presence and location of initialisation, media, index and bitstream switching segments may be provided.

The elements "SegmentBase," "SegmentTemplate" and "SegmentList" may be included in the element "Representation." In addition, to express default values, the elements "SegmentBase," "SegmentTemplate" and "SegmentList" may be included in the element "Period" or "AdaptationSet." When either "SegmentTemplate" or "SegmentList" exists in a level of a hierarchy, the other element may not be present on a lower hierarchy level. The elements "SegmentBase," "SegmentTemplate" and "SegmentList" may inherit attributes and elements from the same element on a higher level. When the same attribute or element is present on both levels, an attribute or element on a lower level may have precedence over the attribute or element on the higher level.

The element "SegmentBase" may include information that is sufficient, when only a single media segment is provided per Representation and a media segment URL is included in the element "BaseURL." When multiple media segments are present, either the element "SegmentList" or "SegmentTemplate" may be used to share the multiple segment base information.

When a representation includes one or more media segments, either the attribute "duration," or element "SegmentTimeLine" may be present.

A segment list may be defined by one or more elements "SegmentList". Each of the elements "SegmentList" may include a list of elements "SegmentURL" for a consecutive list of segment URLs. Each of the segment URLs may include a media segment URL, and a byte range. The element "SegmentURL" may also include an index segment.

A segment template may be defined by the element "SegmentTemplate." To create a list of segments, specific identifiers that are substituted by dynamic values may be assigned to segments.

The segment information may provide the following information:

Presence or absence of initialisation, index and bitstream switching segment information.
   HTTP-URL and possibly a byte range for each accessible segment in each representation.
   All valid segment URLs declared by an MPD.
   For services with attribute "type" of an MPD indicating "dynamic," segment availability start time and segment availability end time of each segment.
   Approximate media presentation start time of each media segment in a media presentation timeline within a period.

A segment element or a sub-element of the segment element may include the following attributes:

"duration" may specify a constant approximate segment duration. All segments within element "Representation" may have the same duration. However, a duration of a last segment within a period may be different from the other segments.
   "sourceURL" may specify a source URL part. "sourceURL" may be formatted either as an <absolute-URI> according to RFC 3986. "sourceURL" may have a fixed scheme of "http://" or "https://" or as a <relative-ref> according to RFC 3986. For example, when "sourceURL" is absent, element "BaseURL" may be mapped to the attribute "sourceURL." Additionally, when "sourceURL" is absent, attribute "range" may be provided.
   "range" may specify a byte range restricting the HTTP-URL. The byte range may be expressed and formatted as a byte-range-spec as defined in RFC 2616. For example, when "range" is absent, the element may refer to the entire resource referenced in the attribute "sourceURL."

The following Table 10 shows an XML syntax of information associated with a segment.

TABLE 10

```
<!-- Segment information base -->
<xs:complexType name="SegmentBaseType">
    <xs:sequence>
        <xs:element name="Initialisation" type="URLType"
minOccurs="0"/>
        <xs:element name="RepresentationIndex" type="URLType"
minOccurs="0"/>
        <xs:any namespace="##other" processContents="lax"
minOccurs="0" maxOccurs="unbounded"/>
    </xs:sequence>
    <xs:attribute name="timescale" type="xs:unsignedInt"/>
    <xs:attribute name="presentationTimeOffset" type=
"xs:unsignedInt"/>
    <xs:attribute name="indexRange" type="xs:string"/>
    <xs:attribute name="indexRangeExact" type="xs:boolean"/>
    <xs:anyAttribute namespace="##other" processContents="lax"/>
</xs:complexType>
<!-- Multiple Segment information base -->
<xs:complexType name="MultipleSegmentBaseType">
    <xs:complexContent>
        <xs:extension base="SegmentBaseType">
            <xs:sequence>
                <xs:element name="SegmentTimeline" type=
"SegmentTimelineType" minOccurs="0"/>
                <xs:element name="BitstreamSwitching" type="URLType"
minOccurs="0"/>
            </xs:sequence>
            <xs:attribute name="duration" type="xs:unsignedInt"/>
            <xs:attribute name="startNumber" type="xs:unsignedInt"/>
        </xs:extension>
    </xs:complexContent>
</xs:complexType>
<!-- Segment Info item URL/range -->
<xs:complexType name="URLType">
    <xs:sequence>
        <xs:any namespace="##other" processContents="lax"
minOccurs="0" maxOccurs="unbounded"/>
    </xs:sequence>
    <xs:attribute name="sourceURL" type="xs:anyURI">
    <xs:attribute name="range" type="xs:string"/>
    <xs:anyAttribute namespace="##other" processContents="lax"/>
</xs:complexType>  <xs:enumeration value="progressive"/>
        <xs:enumeration value="interlaced"/>
        <xs:enumeration value="unknown"/>
    </xs:restriction>
</xs:simpleType>
```

Hereinafter, an additional configuration to select a representation based on a user characteristics and terminal characteristics will be described.

Based on the above-described solutions for DASH, representations may be described with various metadata. Characteristics of representations may be mostly used to select representations based on terminal characteristics, for example a resolution, a connection bandwidth, and the like.

Accessibility features of a representation may be used to support disabled users who have difficulties in perceiving multimedia content. The following embodiments to support accessibility may include 1) Moving Picture Experts Group (MPEG)-21 Digital Item Adaptation (DIA) accessibility description and 2) several hints used to facilitate enhancement/replacement of content components. In essence, the MPEG-21 DIA accessibility description including elements "VisualImpairmentType" and/or "AuditoryImpairmentType" of ISO/IEC 21000-7 may enable description of various symptoms of visual and auditory impairments of a user. The visual and auditory impairments may include, for example, a colour deficiency or low vision.

The following rule may be applied to URIs to identify specific accessibility schemes. For example, the schemes may be included in the above-described element "Accessibility."

For representations containing audio and/or visual content, a URI may be defined as shown in Table 11 below.

TABLE 11 urn:mpeg:mpegB:dash:dash:mp21accessibility:<value>

The URI may be defined to indicate accessibility schemes based on accessibility description of ISO/IEC 21000-7.

For example, when <value> is "s0," an appropriate representation may be prepared in advance, and an associated accessibility description may be described by the element "Accessibility." Different ways may be used to convey the description. For example, the accessibility description may be either conveyed by element "MP21Access," or referenced by attribute "xlink:href" that will be defined below.

When <value> is "s1," a provider may somehow obtain an accessibility description of a disabled user, and may provide appropriate content to the disabled user.

In the context of DASH, when a representation is associated with an accessibility description, the representation may be used for a disabled user whose specific symptoms are described by the accessibility description. Usually, media of the representation may be enhanced (e.g. adjusting contrast or colour) to cope with a problem of the disabled user. In this instance, the enhancement of the media may include, for example, adjustment of a contrast or adjustment of colour.

The above-described element "Accessibility" may be extended as follows. A new child element called "MP21Access" may be used as a container for MPEG-21 DIA accessibility description. Additionally, an optional attribute "xlink:href" may be added to the element "Accessibility" to reference an external description including MPEG-21 DIA accessibility elements.

Furthermore, a new attribute called "use" may be employed as a hint to let a client know the intended use of a representation, for the purpose of accessibility. The above new element and attributes may be applied to a representation group (or an adaptation set), a representation, and a sub-representation.

Semantics of elements and attributes to support accessibility are described as follows:

1) To support accessibility, the elements "Group", "AdaptationSet", "Representation" or "SubRepresentation" may further include the following attributes:

"use" may indicate an intended use of representation(s). The attribute "use" may have values "signLang," "subtitle," "caption," "description," "plusDesc," and the like. The value "signLang" may indicate a use as a sign language. The value "subtitle" may indicate a use as a subtitle. The value "caption" may indicate a use as a caption, namely, a subtitle with additional description. The value "description" may indicate a use as description, for example audio description of a movie. The value "plusDesc" may indicate that content of a corresponding representation is enhanced with description, for example, may indicate a sound track enhanced with audio description.

"xlink:href" may provide a reference to an external MPEG-21 DIA description with elements "AuditoryImpairmentType" and/or "VisualImpairmentType" of ISO/IEC IS 21000-7. The representation or representation group associated with the description may be suitable for disabled users whose problems are described by the description.

"xlink:actuate" may provide processing instructions. The processing instructions may be either "onLoad" or "onRequest. When "xlink:href" is absent, "xlink:actuate" may not exist.

2) To support accessibility, the elements "Group", "AdaptationSet", "Representation" or "SubRepresentation" may further include the following elements:

"Accessibility" may have an index of 0 to N, and may provide information on an accessibility information scheme.

"MP21Access" may have an index of 0 to 1, and may include MPEG-21 DIA description with the elements "AuditoryImpairmentType" and/or "VisualImpairmentType" of ISO/IEC 21000-7. Representations or representation group associated with the description may be suitable for disabled users whose problems are described by the description.

The following Table 12 shows an XML syntax of the elements "Group", "AdaptationSet", "Representation" or "SubRepresentation", to support accessibility.

TABLE 12

```
<!-- RepresentationBase type; extended by other
Representation-related types -->
<xs:complexType name="RepresentationBaseType">
    <xs:sequence>
        <xs:element name="ContentProtection" type=
           "ContentDescriptorType" minOccurs="0"
           maxOccurs="unbounded"/>
        <xs:element name="Accessibility" type="ContentDescriptorType"
           minOccurs="0" maxOccurs="unbounded"/>
        <xs:element name="Rating" type="ContentDescriptorType"
           minOccurs="0" maxOccurs="unbounded"/>
        <xs:element name="Viewpoint" type="ContentDescriptorType"
           minOccurs="0" maxOccurs="unbounded"/>
        <xs:element name="MultipleViews" type="MultipleViewsType"
minOccurs="0"/>
        <xs:any namespace="##other" processContents="lax"
minOccurs="0" maxOccurs="unbounded"/>
    </xs:sequence>
    <xs:attribute name=" group" type="xs:unsignedInt"/>
    <xs:attribute name="width" type="xs:unsignedInt"/>
    <xs:attribute name="height" type="xs:unsignedInt"/>
    <xs:attribute name="parx" type="xs:unsignedInt"/>
    <xs:attribute name="pary" type="xs:unsignedInt"/>
    <xs:attribute name="lang" type="LangVectorType"/>
    <xs:attribute name="mimeType" type="xs:string"/>
    <xs:attribute name="startWithRAP" type="xs:boolean"/>
    <xs:attribute name="frameRate" type="xs:double"/>
    <xs:attribute name="maximumRAPPeriod" type="xs:double"/>
    <xs:attribute name="numberOfChannels" type=
"StringVectorType"/>
    <xs:attribute name="samplingRate" type="StringVectorType"/>
    <xs:attribute name="use" type="UseType"/>
    <xs:anyAttribute namespace="##other" processContents="lax"/>
</xs:complexType>
<xs:simpleType name="UseType">
    <xs:restriction base="xs:string">
        <xs:enumeration value="signLang"/>
        <xs:enumeration value="subtitle"/>
        <xs:enumeration value="caption"/>
        <xs:enumeration value="description"/>
        <xs:enumeration value="plusDesc"/>
    </xs:restriction>
</xs:simpleType>
<!-- Generic named descriptive information about the content -->
<xs:complexType name="ContentDescriptorType">
    <xs:sequence>
        <xs:element minOccurs="0" name="SchemeInformation"
type="xs:string"/>
        <xs:element minOccurs="0" name="MP21Access"
type="xs:string"/>
        <xs:any namespace="##other" processContents="lax"
minOccurs="0" maxOccurs="unbounded"/>
    </xs:sequence>
    <xs:attribute name="schemeIdUri" type="xs:anyURI"
use="required"/>
    <xs:attribute ref="xlink:href"/>
    <xs:attribute ref="xlink:actuate" default="onRequest"/>
    <xs:anyAttribute namespace="##other" processContents="lax"/>
</xs:complexType>
```

Hereinafter, metadata describing a relationship between representations will be described.

There is little metadata for describing a relationship between representation groups. It is difficult for a client to know, for example, which video stream is associated with a given audio description. In several cases, two representation groups may be semantically equivalent, and only a single representation group may need to be selected based on a context. Hereinafter, two simple attributes are proposed for the above-described purpose. The metadata described hereinafter may be useful for accessibility as well as for adaptivity in general.

To describe the relationship between representations, the elements "Group", "AdaptationSet", "Representation" or "SubRepresentation" may further include the following attributes:

"usedWith" may indicate a list of one or more representations or representation groups. When a current representation or a current representation group is used, "usedWith" may be used with a predetermined item of the list. For example, a representation group for audio description may be used with a specific representation group of a video component. A value of "usedWith" may be a whitespace-separated list. Each item of the whitespace-separated list may be identification of a single representation group or a single representation. Identification of a representation group may be a value of attribute "group" or "adaptationSet." Identification of a representation may have a format of attribute "repid." The attribute "repid" may be a value of attribute "id" of the representation.

"equivalentTo" may indicate a list of one or more representations or representation groups. A current representation may be used instead of a predetermined item of the list. For example, a representation group for a subtitle may be used instead of a specific representation group of an audio component. The attribute "equivalentTo" may have the same format as the attribute "usedWith."

The following Table 13 shows an XML syntax of the elements "Group", "AdaptationSet", "Representation" or "SubRepresentation", to describe a relationship between representations.

TABLE 13

```
<!-- RepresentationBase type; extended by other
Representation-related types -->
<xs:complexType name="RepresentationBaseType">
    <xs:sequence>
        <xs:element name="ContentProtection" type=
           "ContentDescriptorType" minOccurs="0"
           maxOccurs="unbounded"/>
        <xs:element name="Accessibility" type="ContentDescriptorType"
           minOccurs="0" maxOccurs="unbounded"/>
        <xs:element name="Rating" type="ContentDescriptorType"
           minOccurs="0" maxOccurs="unbounded"/>
        <xs:element name="Viewpoint" type="ContentDescriptorType"
           minOccurs="0" maxOccurs="unbounded"/>
        <xs:element name="MultipleViews" type="MultipleViewsType"
minOccurs="0"/>
        <xs:any namespace="##other" processContents="lax"
minOccurs="0" maxOccurs="unbounded"/>
    </xs:sequence>
    <xs:attribute name="group" type="xs:unsignedInt"/>
    <xs:attribute name="width" type="xs:unsignedInt"/>
    <xs:attribute name="height" type="xs:unsignedInt"/>
    <xs:attribute name="parx" type="xs:unsignedInt"/>
    <xs:attribute name="pary" type="xs:unsignedInt"/>
    <xs:attribute name="lang" type="LangVectorType"/>
    <xs:attribute name="mimeType" type="xs:string"/>
```

TABLE 13-continued

```
    <xs:attribute name="startWithRAP" type="xs:boolean"/>
    <xs:attribute name="frameRate" type="xs:double"/>
    <xs:attribute name="maximumRAPPeriod" type="xs:double"/>
    <xs:attribute name="numberOfChannels" type="StringVectorType"/>
    <xs:attribute name="samplingRate" type="StringVectorType"/>
    <xs:attribute name="usedWith" type="StringVectorType"/>
    <xs:attribute name="equivalentTo" type="StringVectorType"/>
    <xs:anyAttribute namespace="##other" processContents="lax"/>
</xs:complexType>
<!-- Type for space delimited list of strings -->
<xs:simpleType name="StringVectorType">
    <xs:list itemType="xs:string"/>
</xs:simpleType>
```

Hereinafter, metadata for bit depth will be described.

To select different representations for terminals having different display bit depths, the following attributes for a representation and a representation group may be used. A bit depth may refer to a number of bits used to represent a luma/chroma sample of visual content.

Semantics of attributes for bit depth are described as follows:

To provide a bit depth, the elements "Group", "AdaptationSet", "Representation" or "SubRepresentation" may further include the following attributes:

"bitDepth" may indicate a number of bits used to represent a luma/chroma sample of visual content. When the bit depth varies, for example, in different video pictures, a value of "bitDepth" may be a maximum value of bit depths.

The following Table 14 shows an XML syntax of the elements "Group", "AdaptationSet", "Representation" or "SubRepresentation", to support a bit depth.

TABLE 14

```
<!-- RepresentationBase type; extended by other
Representation-related types -->
<xs:complexType name="RepresentationBaseType">
    <xs:sequence>
        <xs:element name="ContentProtection" type=
          "ContentDescriptorType" minOccurs="0"
          maxOccurs="unbounded"/>
        <xs:element name="Accessibility" type="ContentDescriptorType"
          minOccurs="0" maxOccurs="unbounded"/>
        <xs:element name="Rating" type="ContentDescriptorType"
          minOccurs="0" maxOccurs="unbounded"/>
        <xs:element name="Viewpoint" type="ContentDescriptorType"
          minOccurs="0" maxOccurs="unbounded"/>
        <xs:element name="MultipleViews" type="MultipleViewsType"
minOccurs="0"/>
        <xs:any namespace="##other" processContents="lax"
minOccurs="0" maxOccurs="unbounded"/>
    </xs:sequence>
    <xs:attribute name="group" type="xs:unsignedInt"/>
    <xs:attribute name="width" type="xs:unsignedInt"/>
    <xs:attribute name="height" type="xs:unsignedInt"/>
    <xs:attribute name="parx" type="xs:unsignedInt"/>
    <xs:attribute name="pary" type="xs:unsignedInt"/>
    <xs:attribute name="lang" type="LangVectorType"/>
    <xs:attribute name="mimeType" type="xs:string"/>
    <xs:attribute name="startWithRAP" type="xs:boolean"/>
    <xs:attribute name="frameRate" type="xs:double"/>
    <xs:attribute name="maximumRAPPeriod" type="xs:double"/>
    <xs:attribute name="numberOfChannels" type="StringVectorType"/>
    <xs:attribute name="samplingRate" type="StringVectorType"/>
    <xs:attribute name="use" type="UseType"/>
    <xs:anyAttribute namespace="##other" processContents="lax"/>
</xs:complexType>
<xs:simpleType name="UseType">
    <xs:restriction base="xs:string">
        <xs:enumeration value="signLang"/>
        <xs:enumeration value="subtitle"/>
        <xs:enumeration value="caption"/>
```

TABLE 14-continued

```
        <xs:enumeration value="description"/>
        <xs:enumeration value="plusDesc"/>
    </xs:restriction>
</xs:simpleType>
<!-- Generic named descriptive information about the content -->
<xs:complexType name="ContentDescriptorType">
    <xs:sequence>
        <xs:element minOccurs="0" name="SchemeInformation"
type="xs:string"/>
        <xs:element minOccurs="0" name="MP21Access"
type="xs:string"/>
        <xs:any namespace="##other" processContents="lax"
minOccurs="0" maxOccurs="unbounded"/>
    </xs:sequence>
    <xs:attribute name="schemeIdUri" type="xs:anyURI"
use="required"/>
    <xs:attribute ref="xlink:href"/>
    <xs:attribute ref="xlink:actuate" default="onRequest"/>
    <xs:anyAttribute namespace="##other" processContents="lax"/>
</xs:complexType>
```

Correspondingly, two attributes "minBitDepth" and "maxBitDepth" may be added to elements "Representation Group" or "AdaptationSet".

Semantics of attributes to describe a maximum bit depth and a minimum bit depth are described as follows:

To describe the maximum bit depth and the minimum bit depth, the elements "Representation Group," "Group," or "AdaptationSet" may further include the following attributes:

"xlink:href" may indicate a reference to external element "Group" or element "AdaptationSet".

"xlink:actuate" may provide processing instructions. The processing instructions may be either "onLoad" or "onRequest".

"minBitDepth" may indicate a minimum bit depth value, in all representations in a group or an adaptation set.

"maxBitDepth" may indicate a maximum bit depth value, in all representations in a group or an adaptation set.

The following Table 15 shows an XML syntax of the elements "Representation Group", "Group", or "AdaptationSet", to support the maximum bit depth value and the minimum bit depth value.

TABLE 15

```
<!-- Group to contain information common to a group;
    extends RepresentationBaseType -->
<xs:complexType name="GroupType">
    <xs:complexContent>
        <xs:extension base="RepresentationBaseType">
            <xs:sequence>
                <xs:element name="Representation" type="RepresentationType"
                    minOccurs="0" maxOccurs="unbounded"/>
                <xs:element name="SegmentInfoDefault" type=
"SegmentInfoDefaultType" minOccurs="0"/>
            </xs:sequence>
            <xs:attribute ref="xlink:href"/>
            <xs:attribute ref="xlink:actuate" default="onRequest"/>
            <xs:attribute name="minBandwidth" type="xs:unsignedInt"/>
            <xs:attribute name="maxBandwidth" type="xs:unsignedInt"/>
            <xs:attribute name="minWidth" type="xs:unsignedInt"/>
            <xs:attribute name="maxWidth" type="xs:unsignedInt"/>
            <xs:attribute name="minHeight" type="xs:unsignedInt"/>
            <xs:attribute name="maxHeight" type="xs:unsignedInt"/>
            <xs:attribute name="minFrameRate" type="xs:double"/>
            <xs:attribute name="maxFrameRate" type="xs:double"/>
            <xs:attribute name="minBitDepth" type="xs:unsignedInt"/>
            <xs:attribute name="maxBitDepth" type="xs:unsignedInt"/>
            <xs:attribute name="subsegmentAlignment" type="xs:boolean"
default="false"/>
            <xs:attribute name="segmentAlignmentFlag"
type="xs:boolean"/>
```

TABLE 15-continued

```
        <xs:attribute name="bitStreamSwitchingFlag"
type="xs:boolean"/>
        <xs:anyAttribute namespace="##other" processContents="lax"/>
      </xs:extension>
    </xs:complexContent>
</xs:complexType>
```

Figure 2:
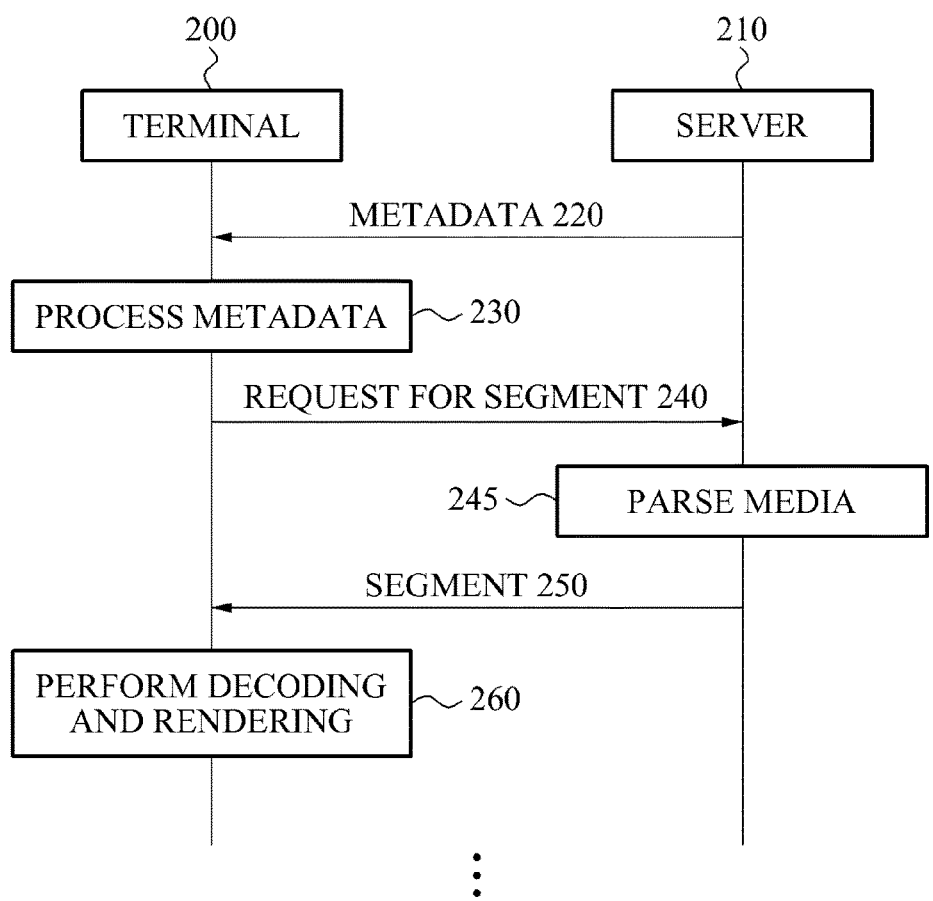
FIG. 2 is a signal flowchart illustrating a content processing method according to an embodiment of the present invention.

FIG. 2 is a signal flowchart illustrating a content processing method according to an embodiment of the present invention.

A terminal 200 may be a DASH client described above.

The DASH client may be compatible with a client specified in RFC 2616.

The DASH client may typically use an HTTP GET method or an HTTP partial GET method, as specified in RFC 2616, to access segments or parts of segments.

A server 210 may perform hosting on DASH segments. The server 210 may be compatible with a server specified in RFC 2616.

In operation 220, the terminal 200 may receive metadata of media content from the server 210. In other words, the server 210 may transmit the metadata of the media content to the terminal 200. The media content may include one or more periods.

Metadata may be an MPD.

The MPD may provide sufficient information to the terminal to provide a user with a streaming service by accessing segments through a protocol specified in a scheme of defined resources. The specified protocol may be an HTTP/1.1. The server 210 may provide an MPD delivery function. The MPD may be generated based on DASH media presentation preparation.

In operation 230, the terminal 200 may process the received metadata. In operation 230, the terminal 200 may extract information provided by the metadata, or information included in the metadata.

In operations 240 through 250, the terminal 200 may access a segment of the media content based on the information provided by the metadata. The server 210 may be an HTTP server used to provide a DASH segment transfer function.

Each of the periods may include one or more groups, and each of the groups may include one or more representations of the media content. In other words, each of the periods may include the one or more representations of the media content. Accordingly, each of the representations may start from a beginning point of a period including each of the representations, and may continue to an ending point of the period. Each of the representations may include one or more segments.

In operation 240, the terminal 200 may send a request for a segment of the media content to the server 210 using a URL of the segment. The URL may be resolved with respect to the above-described element "BaseURL." For example, the URL of the segment may be generated based on the element "BaseURL."

The MPD may provide the terminal 200 with sufficient information to provide a user with a streaming service, by 1) requesting the server 210 to transmit segments, and by 2) demultiplexing, decoding, and rendering media streams included in a segment.

The terminal 200 may request the server 210 to transmit a segment suitable for a specific period based on the processed metadata. In other words, the requested segment may be selected based on the metadata. The terminal 200 may perform the HTTP GET method, to request the server 210 to transmit the segment.

The metadata may include an attribute "range". The request may include a request for bytes of a resource indicated by a URL that are designated by the attribute "range."

The URL of the segment may be an absolute URL or a relative URL.

The terminal 200 may select a period, an adaptation set, a representation, and the like, using an element or attribute included in the metadata, and may select a segment to be requested, based on an element or attribute of the selected period, the selected adaptation set, or the selected representation.

For example, each of one or more representations included in a period may include information used to support disabled users who have difficulties in perceiving media content. A media component of each of the representations may be enhanced to cope with a problem of a disabled user. Enhancement of the media component may include at least one of adjustment of a contrast and adjustment of colour. Additionally, information included in each of the representations may indicate an intended use of each of the representations. The intended use may include at least one of a sign language, a subtitle, a caption, and a description. The information included in each of the representations may include an attribute providing a reference to an external MPEG-21 DIA.

For example, metadata may include an attribute describing a relationship between one or more representations. A first representation among the representations may include an attribute indicating a list of a part of the representations. The first representation may be used together with a representation among the part of the representations. The first representation may be a representation used for audio description, and each of the part of the representations may be a representation used for a video component. Additionally, a second representation among the representations may include an attribute indicating a list of a part of the representations, and a representation among the part of the representations may be replaced by the second representation.

For example, each of one or more representations included in a period may include a bit depth attribute used to select different representations for terminals having different display bit depths.

The bit depth attribute may indicate a number of bits used to represent a luma/chroma sample of visual content.

In operation 245, in several cases, the server 210 may need to parse media content (for example, an MPEG layer 4 (MP4) file for Scalable Video Coding (SVC)), and may extract a data part suitable for the requested segment.

In operation 250, the server 210 may transmit, to the terminal 200, segments suitable for each request from the terminal 200. The terminal 200 may receive the segments from the server 210.

In operation 260, the terminal 200 may perform decoding and rendering on data of the media content included in the segment, to play back the media content.

The terminal 200 may play back the media content using the received segments by repeating operations 220 through 260.

Technical information according to the embodiments of the present invention described above with reference to FIG. 1 may equally be applied to the present embodiment. Accordingly, further description thereof will be omitted.

Figure 3:
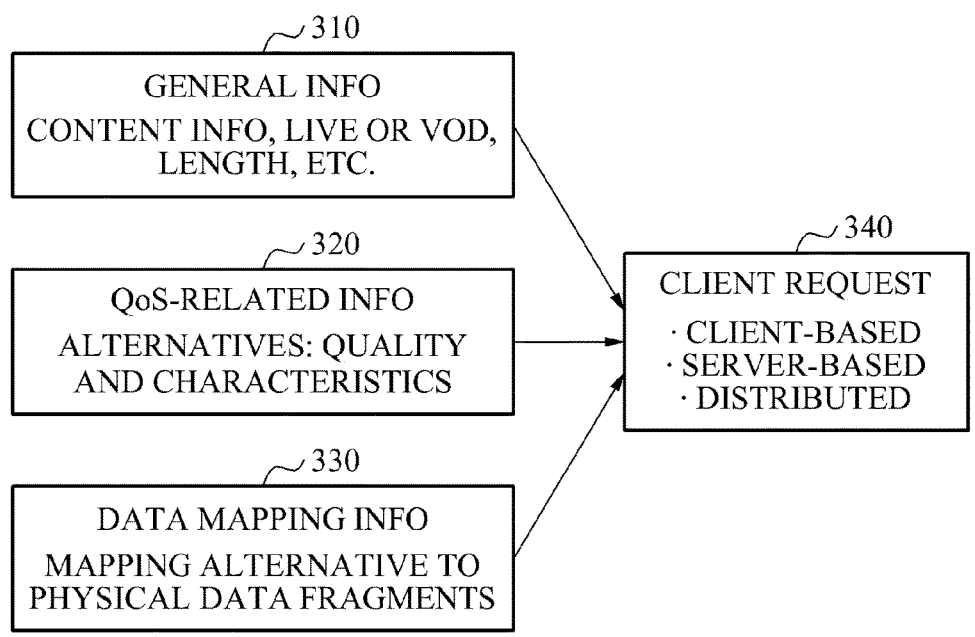
FIG. 3 is a diagram illustrating categories of signaling information according to an embodiment of the present invention.

FIG. 3 is a diagram illustrating categories of signaling information according to an embodiment of the present invention.

The signaling information (namely, metadata) may be divided into the following categories 1) through 4):

1) General information 310: may include common description of content, and general description of each interval, such as a duration, and a start time.

2) Quality of Service (QoS) information 320: may describe characteristics of each alternative, such as a bitrate, a resolution, and a quality. In other words, the QoS information describes characteristics of each of alternatives of content.

An alternative may be physical (namely, created in advance), or may be virtual (namely, to be created on the fly). Based on information of alternatives, the client may select a fragment of an appropriate alternative. Accordingly, adaptivity to contexts of terminals and networks may be supported.

3) Mapping information 330: may describe locations to retrieve content. Depending on specific cases, different alternatives may have the same or different locations.

4) Client request 340: this type of signaling information may conform to a format of HTTP 1.1 request message. Parameters requested by a client may be derived from the information of categories 1) through 3).

Figure 4:
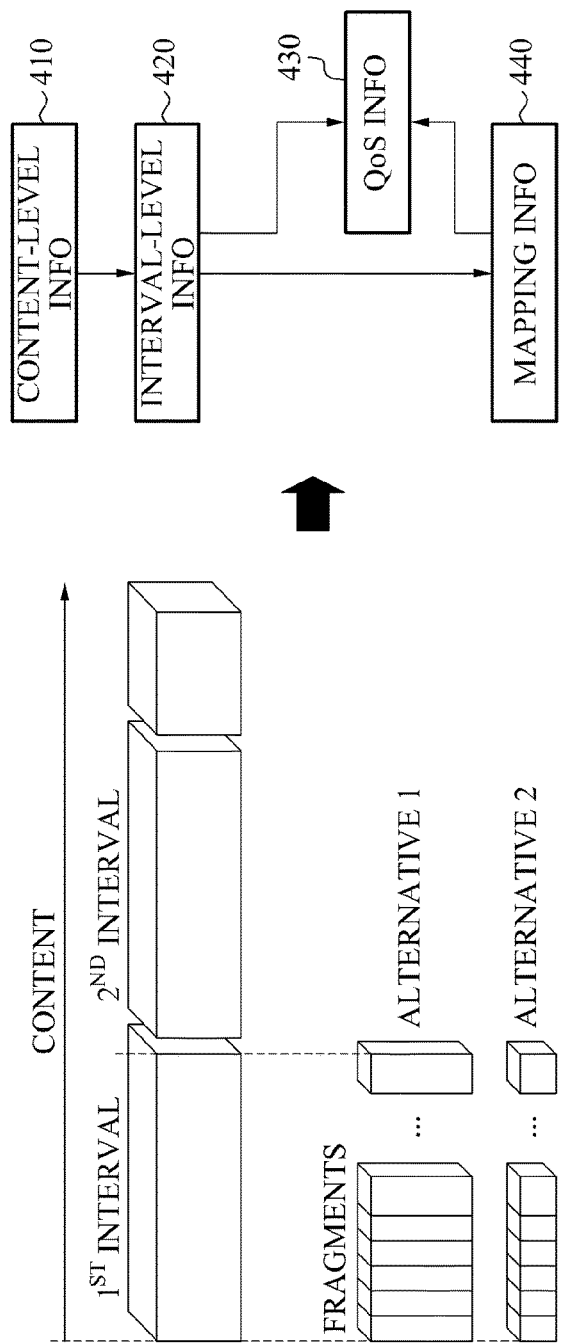
FIG. 4 is a diagram illustrating a hierarchy of content division and levels of signaling information according to an embodiment of the present invention.

FIG. 4 is a diagram illustrating a hierarchy of content division and levels of signaling information according to an embodiment of the present invention.

Signaling of metadata according to an embodiment of the present invention may be physically separated into content-level information 410, interval-level information 420, QoS information 430, and mapping information 440. Linking of related parts of the content-level information 410, the interval-level information 420, the QoS information 430, and the mapping information 440 may be performed by reference.

These parts of signaling information may be combined in different ways to support the flexibility.

For example, when only the content-level information 410 and interval-level information 420 are sent to a client, all computations for deciding alternatives and resolving locations may be performed by a server. Accordingly, when only the content-level information 410 and interval-level information 420 are sent to the client, a processing model may be "server-based."

When the content-level information 410, the interval-level information 420, and the QoS information 430 are sent to the client, all computations for deciding alternatives and resolving locations may be distributed and performed by the client and the server. Accordingly, when the content-level information 410, the interval-level information 420, and the QoS information 430 are sent to the client, the model may be "distributed."

When all the signaling information (namely, the content-level information 410, the interval-level information 420, the QoS information 430, and the mapping information 440 is sent to the client, the model may be client-based, because most (or all) processing (namely, computations for deciding alternatives and resolving locations) is performed by the client.

The separation of metadata parts may enable efficiency in storage and delivery. For example, during a session, metadata of the content-level information 410 may be sent once, and only the interval-level information 420 may be periodically updated. Similarly, a single file containing the QoSInfo 430 may be used for different intervals and different contents.

Figure 5:
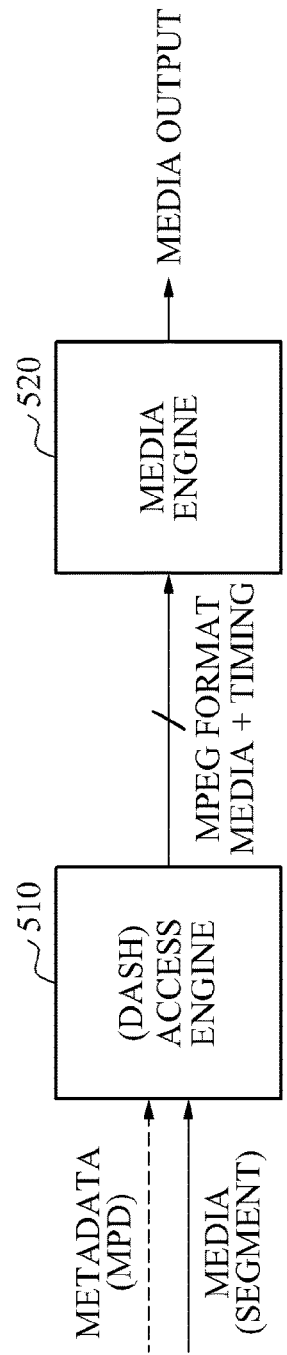
FIG. 5 is a diagram illustrating a configuration of a terminal according to an embodiment of the present invention.

FIG. 5 is a diagram illustrating a configuration of a terminal according to an embodiment of the present invention.

A structure of a terminal 100 may represent logical components of a conceptual DASH client model.

The terminal 100 may include an access engine 510, and a media engine 520.

The access engine 510 may be a DASH access engine.

The access engine 510 may receive metadata (for example, an MPD) from a server 110.

The access engine 510 may form requests, and may issue the formed requests to the server 110.

The access engine 510 may receive content (for example, segments or parts of the segments) from the server 110.

The access engine 510 may provide the content to the media engine 520.

An output of the access engine 510 may include media (or a part of the media) of an MPEG container (for example, an ISO/IEC 14492-12 ISO base media file format, or an ISO/IEC 13818-2 MPEG-2 transport stream). Additionally, the output of the access engine 510 may include timing information used to map internal timing of the media to a timeline of a media presentation.

Additionally, the access engine 510 may perform functions of the terminal 200 that are described in operations 220 through 260 of FIG. 2.

The media engine 520 may play back the provided content. Specifically, the media engine 520 may output the media using the media and the timing information that are output from the access engine 510.

Technical information according to the embodiments of the present invention described above with reference to FIGS. 1 through 4 may equally be applied to the present embodiment. Accordingly, further description thereof will be omitted.

The method according to the above-described embodiments of the present invention may be recorded in computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of providing media content performed by a DASH (Dynamic Adaptive Streaming over HTTP) client, the method comprising:
    receiving a Media Presentation Description (MPD) of a media content; and
    accessing segments of the media content based on information provided by the MPD,
    wherein the MPD includes one or more periods,
    wherein each of the periods includes one or more adaptation sets,
    wherein each of the adaptation sets includes one or more representations,
    wherein each of the representations includes one or more segments,
    wherein the MPD, the period, the adaptation set, the representation, or the segments includes one or more attributes or elements, and
    wherein the adaptation set includes one or more attributes or elements that are common to each of the representations for that adaptation set.

2. The method of claim 1, wherein the attribute included at an MPD level is a maxSegmentDuration, wherein the maxSegmentDuration is a maximum duration of a segment in a representation.

3. The method of claim 1, wherein the element included at an adaptation set level is an Accessibility, wherein the Accessibility specifies information on an accessibility scheme.

4. The method of claim 1, wherein the attribute included at an adaptation set level is an audioSampleRate, wherein the audioSampleRate specifies a sampling rate of an audio media component type.

5. The method of claim 1, wherein the element included at an adaptation set level is an AudioChannelConfiguration, wherein the AudioChannelConfiguration specifies an audio channel configuration of an audio media component type.

6. The method of claim 1, wherein the attribute included in an adaptation set level is a contentType, wherein the contentType specifies a type of a media content component.

7. The method of claim 1, wherein the attribute included at an adaptation set level is a sample aspect ratio of a video media component type.

8. The method of claim 1, wherein the attribute included at a representation level is an audioSampleRate, wherein the audioSampleRate specifies a sampling rate of an audio media component type.

9. The method of claim 1, wherein the element included at a representation level is an AudioChannelConfiguration, wherein the AudioChannelConfiguration specifies an audio channel configuration of an audio media component type.

10. The method of claim 1, wherein the attribute included at a representation level is a sample aspect ratio of a video media component type.

11. A method of providing media content performed by a server or multiple servers, comprising:
    transmitting a Media Presentation Description (MPD) of a media content to a client;
    receiving a request, from the client, for a segment of the media content;
    transmitting the media content to the client,
    wherein the MPD includes one or more periods,
    wherein each of the periods includes one or more adaptation sets,
    wherein each of the adaptation sets includes one or more representations,
    wherein each of the representations includes one or more segments,
    wherein the MPD, the period, the adaptation set, the representation or the segments includes one or more attributes or elements, and,
    wherein the adaptation set includes one or more attributes or elements that are common to each of the representations for that adaptation set.

12. The method of claim 11, wherein the attribute included at an MPD level is a maxSegmentDuration, wherein the maxSegmentDuration is a maximum duration of a segment in a representation.

13. The method of claim 11, wherein the element included at an adaptation set level is an Accessibility, wherein the Accessibility specifies information on an accessibility scheme.

14. The method of claim 11, wherein the attribute included at an adaptation set level is an audioSampleRate, wherein the audioSampleRate specifies a sampling rate of an audio media component type.

15. The method of claim 11, wherein the element included at an adaptation set level is an AudioChannelConfiguration, wherein the AudioChannelConfiguration specifies an audio channel configuration of an audio media component type.

16. The method of claim 11, wherein the attribute included at an adaptation set level is a contentType, wherein the contentType specifies a type of a media content component.

17. The method of claim 11, wherein the attribute included at an adaptation set level is a sample aspect ratio of a video media component type.

18. The method of claim 11, wherein the attribute included at a representation level is an audioSampleRate, wherein the audioSampleRate specifies a sampling rate of an audio media component type.

19. The method of claim 11, wherein the element included at a representation level is an AudioChannelConfiguration, wherein the AudioChannelConfiguration specifies an audio channel configuration of an audio media component type.

20. The method of claim 11, wherein the attribute included at a representation level includes a sample aspect ratio of a video media component type.

21. A method of providing media content performed by a server or multiple servers, comprising:
    transmitting a Media Presentation Description (MPD) of a media content to a client;
    receiving a request, from the client, for a segment of the media content;
    transmitting the media content to the client,
    wherein the MPD includes one or more periods,
    wherein each of the periods includes one or more adaptation sets,
    wherein each of the adaptation sets includes one or more representations,
    wherein each of the representations includes one or more segments, and
    wherein information on a location, availability or property for the one or more segments in a representation is comprised in a SegmentBase element.

22. The method of claim 21, wherein the SegmentBase element is included at a period level.

23. The method of claim 21, wherein the SegmentBase element is included at an adaptation set level.

24. The method of claim 21, wherein the SegmentBase element is included at a representation level.

25. A method of providing media content performed by a server or multiple servers, comprising:

transmitting a Media Presentation Description (MPD) of a media content to a client;
receiving a request, from the client, for a segment of the media content;
transmitting the media content to the client,
wherein the MPD includes one or more periods,
wherein each of the periods includes one or more adaptation sets,
wherein each of the adaptation sets includes one or more representations,
wherein each of the representations includes one or more segments, and
wherein information on a location, availability or property for the one or more segments in a representation is comprised in a SegmentTemplate element.

26. The method of claim 25, wherein the SegmentTemplate element is included at a period level.

27. The method of claim 25, wherein the SegmentTemplate element is included at an adaptation set level.

28. The method of claim 25, wherein the SegmentTemplate element is included at a representation level.

29. The method of claim 25, wherein a duration attribute and a SegmentTimeline element are provided.

30. The method of claim 25, wherein when a SegmentTimeline element is absent, a duration attribute is comprised in the SegmentList element.

* * * * *

(12) INTER PARTES REVIEW CERTIFICATE (2786th)

United States Patent
Thang et al.

(10) Number: US 10,313,414 K1
(45) Certificate Issued: Aug. 4, 2022

(54) APPARATUS AND METHOD FOR PROVIDING STREAMING CONTENT USING REPRESENTATIONS

(71) Applicants: Truong Cong Thang; Jin Young Lee

(72) Inventors: Truong Cong Thang; Jin Young Lee

(73) Assignee: HELIOS STREAMING, LLC

Trial Number:

IPR2020-01689 filed Sep. 26, 2020

Inter Partes Review Certificate for:

Patent No.: 10,313,414
Issued: Jun. 4, 2019
Appl. No.: 16/229,092
Filed: Dec. 21, 2018

The results of IPR2020-01689 are reflected in this inter partes review certificate under 35 U.S.C. 318(b).

INTER PARTES REVIEW CERTIFICATE
U.S. Patent 10,313,414 K1
Trial No. IPR2020-01689
Certificate Issued Aug. 4, 2022

AS A RESULT OF THE INTER PARTES REVIEW PROCEEDING, IT HAS BEEN DETERMINED THAT:

Claims 1, 11, 25, 27 and 29 are cancelled.

* * * * *